May 29, 1923.
F. F. FORSHEE
1,456,873
ALUMINUM DIRT TRAY AND REFLECTOR
Filed July 19, 1920
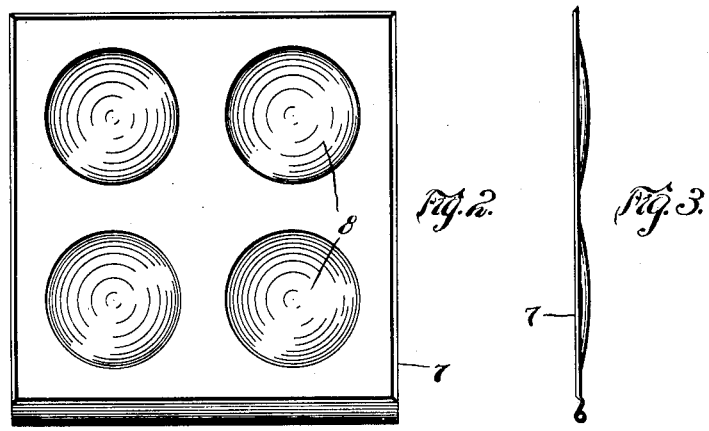
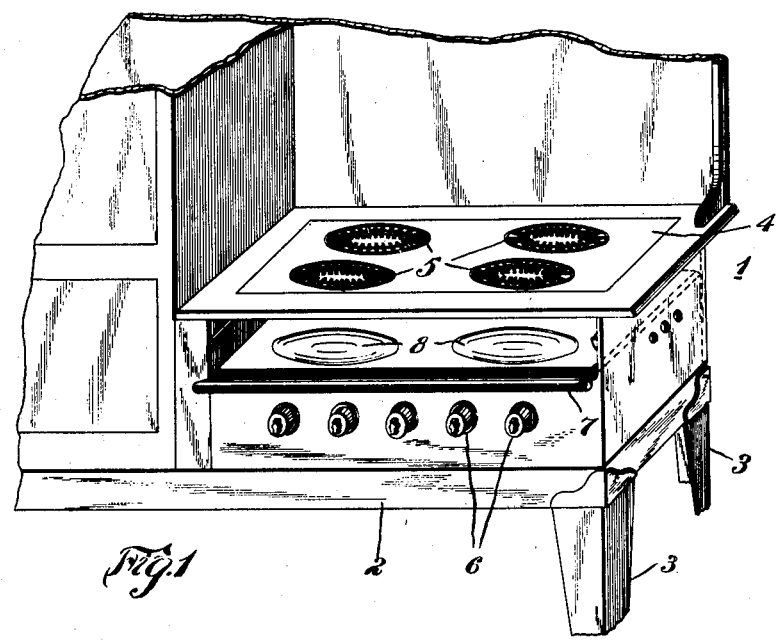
WITNESSES:
INVENTOR
Frank F. Forshee.
BY
ATTORNEY Patented May 29, 1923.

1,456,873

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

ALUMINUM DIRT TRAY AND REFLECTOR.

Application filed July 19, 1920. Serial No. 397,291.

*To all whom it may concern:*

Be it known that I, FRANK F. FORSHEE, a citizen of the United States, and a resident of Flint, in the county of Genesee and State of Michigan, have invented a new and useful Improvement in Aluminum Dirt Trays and Reflectors, of which the following is a specification.

My invention relates to electrically-heated apparatus and particularly to electric ranges.

The object of my invention is to provide an aluminum heat reflector and dirt tray for an electric stove.

Heretofore, dirt trays used in gas and electric stoves have been made of iron and finished in black or in white enamel. I have found that this type of dirt tray absorbs a large percentage of the heat rays instead of reflecting them, thus reducing the efficiency of the heating element. I have further found that it is impossible to keep the surface of the dirt tray in such condition that it will not absorb a greater amount of heat after it has been subjected to the action of material which may fall thereon during the cooking operation.

This is of particular importance in electrical stoves where the insulation on the wire may be seriously affected and injured by reason of the large amount of heat which may be stored in such dirt tray in one part thereof and conducted to another part with which the wires may be in contact.

In practicing my invention, I provide an aluminum dirt tray located beneath the electrical heating elements of a stove, the tray having a plurality of depressed concave portions therein adapted to act as heat reflectors for the electrical heating elements.

Referring to the single sheet of drawings,

Figure 1 is a perspective view of the device embodying my invention as applied to the stove of an electric range;

Fig. 2 is a top plan view of the device embodying my invention, and

Fig. 3 is a view in side elevation of the device.

An electric range 1 is shown as of the usual construction and comprises a frame 2 having supporting members 3 and a top or stove plate 4 in which are mounted a plurality of electric heating elements 5 which may be controlled by means of switches 6 mounted in a suitable location on the frame 2. While I have shown my device as applied to an electric range, it is to be understood that this is to illustrate its application only and that it may be applied to any type of electric or gas stove. A combined aluminum dirt tray and reflector 7 is located immediately below the stove top 4 and the heating elements 5.

This plate 7 may be made of a single sheet of aluminum and has stamped therein a number of depressed concave portions 8, these portions 8 being so located in the plate 7 that, when it is in its operative position, they will be immediately below the heating elements 5. These surfaces 8 act to reflect any heat which may be radiated downwardly against the plate 7, back against the lower surface of the heating elements 5 and thus tend to not only raise the temperature of the heating elements 5, but also prevent any relatively large amount of heat from being radiated against that part of the frame 2 in which the switches 6 and the conducting wires (not shown) are located.

The provision of the concave portions 8 in the plate 7 operates to strengthen the plate and to prevent its being easily bent and these same portions 8 act, as stated above, to reflect the heat back against the heating element and, as the mass of material in the aluminum plate 7 is relatively small, only a very small amount of heat may be stored therein and this amount of heat may be still further reduced by the reflecting action of the depressed surfaces 8.

Various modifications may be made in the device without departing from the spirit and scope of my invention, and I desire, therefore, that only such limitations shall be placed thereon as are imposed by the prior art or are specifically set forth in the appended claims.

I claim as my invention:

1. An electrical stove comprising an electrical heating element and a substantially concave aluminum heat reflector therefor.

2. An electrical stove comprising an electrical heating element and a substantially concave aluminum heat reflector located beneath said heating element.

3. An electrical stove comprising an electrical heating element, a substantially concave, aluminum, combination dirt tray and heat reflector located beneath said heating element, and supporting means for said heating means and said combination dirt tray and heat reflector.

4. In an electrically-heated apparatus, the combination with a supporting means and a plurality of electric heating elements supported thereby, of an aluminum heat reflector and dirt tray located beneath said heating elements and having a plurality of integral concave portions each located under one of said heating elements.

5. An electrical stove comprising an electrical heating element and a combination aluminum utensil and heat reflector therefor.

In testimony whereof, I have hereunto subscribed my name this 6th day of July, 1920.

FRANK F. FORSHEE.